US008572826B2

(12) United States Patent
Bilgen et al.

(10) Patent No.: US 8,572,826 B2
(45) Date of Patent: Nov. 5, 2013

(54) METHOD AND DEVICE FOR IN-LINE SURFACE TREATMENT OF SLABS

(75) Inventors: Christian Bilgen, Düsseldorf (DE); Tilmann Böcher, Düsseldorf (DE); Luc Neumann, Düsseldorf (DE); Marcel Gathmann, Düsseldorf (DE); Christian Klinkenberg, Herdecke (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 13/522,355

(22) PCT Filed: Jan. 10, 2011

(86) PCT No.: PCT/EP2011/050196
§ 371 (c)(1),
(2), (4) Date: Oct. 5, 2012

(87) PCT Pub. No.: WO2011/086040
PCT Pub. Date: Jul. 21, 2011

(65) Prior Publication Data
US 2013/0014362 A1 Jan. 17, 2013

(30) Foreign Application Priority Data

Jan. 14, 2010 (DE) .......... 10 2010 004 563

(51) Int. Cl.
*B21B 45/04* (2006.01)
*B21B 45/06* (2006.01)

(52) U.S. Cl.
USPC ....... 29/81.01; 29/81.03; 29/81.06; 29/81.07; 29/81.08

(58) Field of Classification Search
USPC ........... 29/81.01, 81.03, 81.05, 81.06, 81.07, 29/81.08, 81.09, 81.13
See application file for complete search history.

(56) References Cited

U.S. PATENT DOCUMENTS

| 2,312,418 A | 3/1943 | Keller et al. |
| 2,453,019 A | 11/1948 | King |

(Continued)

FOREIGN PATENT DOCUMENTS

| DE | 4001524 | 7/1990 |
| EP | 1093866 A | 4/2001 |

(Continued)

OTHER PUBLICATIONS

Untersuchungen uber die Bildungsbedingungen technisch nutzbarer Oxydschichten.

*Primary Examiner* — Jermie Cozart
(74) *Attorney, Agent, or Firm* — Lucas & Mercanti, LLP; Klaus P. Stoffel

(57) ABSTRACT

A method and a device for improving the outer surface quality by an in-line outer surface treatment of slabs, which are produced in a continuous process from strand casting to hot rolling, with a heating furnace arranged between a CSP-casting machine and a hot rolling train. A defined surface of the slab with a layer thickness per slab side of up to 4 mm is oxidized in a targeted manner by an oxidation device. An oxidation treatment of the slab surface is combined with the following processing in-line method steps: prior to the oxidation treatment the outer surface of the slab is freed of naturally occurring scale by a scale washer, after the oxidation treatment a created oxidation layer as well as the newly formed scale is cooled, mechanically broken up in a roll pair and removed from the surface of the slab by a scale washer.

9 Claims, 3 Drawing Sheets

(56) References Cited

U.S. PATENT DOCUMENTS

| | | | |
|---|---|---|---|
| 4,898,628 A | | 2/1990 | Block et al. |
| 6,385,832 B1 * | | 5/2002 | Grafe et al. ............... 29/81.08 |
| 6,389,666 B1 * | | 5/2002 | Grothe ....................... 29/81.08 |
| 2007/0277358 A1 * | | 12/2007 | Gaydoul .................... 29/81.08 |

FOREIGN PATENT DOCUMENTS

| | | |
|---|---|---|
| EP | 0867239 B1 | 11/2002 |
| JP | 6315702 | 11/1994 |
| JP | 2008221234 | 9/2008 |

\* cited by examiner

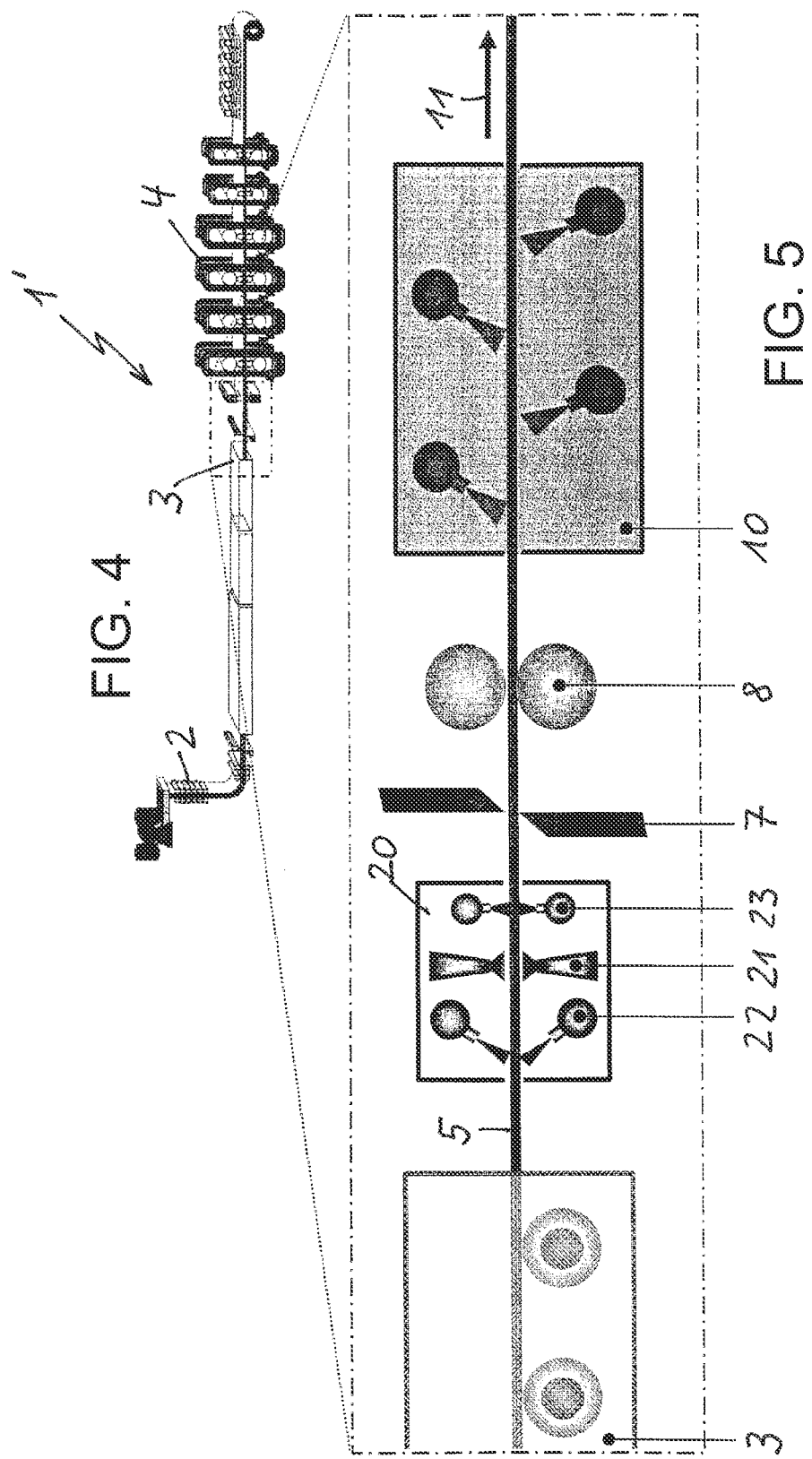

METHOD AND DEVICE FOR IN-LINE SURFACE TREATMENT OF SLABS

The present application is a 371 of International application PCT/EP2011/050196, filed Jan. 10, 2011, which claims priority of DE 10 2010 004 563.2, filed Jan. 14, 2010, the priority of these applications is hereby claimed and these applications are incorporated herein by reference.

BACKGROUND OF THE INVENTION

The invention relates to a method and an apparatus for improving the surface quality by an in-line surface treatment of slabs which are produced in a continuous process from strip casting up to hot rolling, for example according to the Compact Strip Production (CSP) process with a heating furnace arranged between the casting machine and the hot rolling train. With the help of an oxidation device containing a nozzle or nozzle-like devices, an oxidizing flame or an oxidizing gas mixture is applied to the upper and lower sides of the slab and is targeted so that a defined outer surface layer of the slab with a layer thickness at each slab side up to 4 mm is oxidized; the oxidation product on the slab surface can be solid or liquid.

A related method is disclosed in U.S. Pat. No. 2,453,019 A. A different solution is shown in U.S. Pat. No. 2,312,418 A.

In strip casting plants, particularly in slab casting plants such as for example CSP-plants, cast strands are produced dimensions approaching the end product. Since slabs are removed from the end product with only a few process steps, a smooth and flawless upper surface of the slab is necessary.

Thin and thick slabs produced by continuous strip casting up to 400 mm thick can have near and on the outer surface small imperfections and casting powder residue can be present along with changes in the chemical composition in the edge regions of the outer surface.

Imperfections are for example oscillation marks which because of process technical grounds are unavoidable, and, for example pores. Chemical changes in the steel composition in the edge regions of the outer surface can be caused by material exchange between the steel and the casting powder based on diffusion processes at high temperatures in the mold. Smaller imperfections, casting powder residues and changes in the chemical composition near the outer surface are mostly removed during the casting and heating processes and by rolling of the slabs. In unfavorable situations however, cosmetic surface imperfections are visible in the pickled hot strand, i.e. in the form of oscillation mark shadows.

EP 0 867 239 B1 describes a method for producing hot wide strand, wherein the cast slab strand is divided in sections and, after a tempering treatment in a continuous oven, is rolled out. In order to improve the quality of the outer surface of the slab sections before rolling, it is proposed to interrupt a tempering process of a defective slab section by an outer surface treatment by grinding or flame-scarfing in an outer surface processing device and to carry out the outer surface treatment at a variable speed that is decoupled from the casting speed. If necessary, the slab sections are conducted to a segment of the continuous furnace that is laterally adjacent to the finishing line for carrying out the outer surface treatment.

A method and an apparatus for improving the outer surface of a cast strand of a preferably slab casting plant, by an in-line removal of the outer surface of the cast strand are known from EP 1 093 866 A2. Removal is carried out after the cast strand passes through a heating oven shortly before the in-line rolling of the cast strand. For this purpose electric arcs, laser beams or mechanical means are used, preferably however hot flames with an in-line flame machine with our without mechanical working of the surface of the cast strand. In order to avoid or substantially avoid subsequent oxidation or secondary scale formation on the treated outer surface, it is beneficial to hold the casting strand under inert gas or flue gas or to directly roll after the hot flaming.

SUMMARY OF THE INVENTION

Beginning from the indicated prior art, the present invention has the objective of providing a method and an apparatus for in-line surface treatment of slabs produced in a continuous process, for example pursuant to the CSP-process, by which hot strips can be produced with high output and an excellent outer surface quality, and by which the occurrence of portrayed remaining cosmetic outer surface apparitions is completely prevented.

The stated object is accomplished by the present invention in that the oxidation treatment of the slab surface with an oxidizing flame or with an oxidizing gas mixture is combined with the following processing in-line method steps: prior to the oxidation treatment the outer surface of the slab is freed of naturally occurring scale by a low pressure or high pressure scale washer, after the oxidation treatment the created oxidation layer as well as the newly formed scale is cooled by water cooling nozzles or other appropriate media or tasks, mechanically broken up in a roll pair and removed from the surface of the slab by a low pressure scale washer or a conventional high pressure scale washer.

For targeted production of oxidized layer thicknesses the following settings are carried out, which can be utilized either individually or in combination:

Variation of the oxidation potential of the flame or gas mixture applied for oxidizing the outer surface of the slab,
  Varying the volume stream of the gas used for the oxidation,
  Varying the oxidation potential and/or the volume stream of the gas used for oxidation in dependence on a process parameter such as, slab transport speed and steel quality,
  Varying the spacing and the angle of the nozzles or the nozzle like devices relative to the slab surface,
  Construction and number of the nozzles or nozzle-like devices.

The inventive in-line oxidation treatment of the slab surface with an oxidizing flame or an oxidizing gas mixture, which is also usable with extremely thin slabs, which are known as thin slabs, is linked with the following prior and subsequently connected processing in-line method steps:

Before the oxidation processing, naturally occurring scale is removed from the slab surface. This takes place in a scale washer that can be operated in a low pressure or high pressure range.

After the oxidation processing, in order to embrittle the formed layers (oxide layers as well as newly created scale), these are cooled by wetting nozzles spraying, for example, water. These layers are then mechanically broken in a following roll pair and are then removed in a scale washer.

In dependence on the presently prevailing space conditions, the in-line surface treatment of the slab can be carried out after exiting the casting machine and before entry in the heating furnace or alternatively after exiting the heating furnace and before entry into the hot rolling train. When the surface treatment is carried before the heating furnace, a low pressure scale washer (slab rinser with pressures less than 100 bar) or a rotating descaler can be inserted for removing the formed layers.

When the surface treatment is carried out after the heating furnace the high pressure scale washer, that is operated at high pressures (greater than 100 bar) which is conventionally before the hot rolling train, can be used on the outer surface processing device. In this case the rolled pair used for mechanically breaking the formed layers is also used as a drive roll pair for the conventional high pressure scale washer.

Pursuant to the invention, all of the apparatuses and devices necessary for the outer surface treatment are preferably moveable into and out of the production line individually or in combination so that dependent upon process parameters, such as steel type, casting speed, no-steady-state conditions, the outer surface treatment is not carried out on the entire production but rather is selectively limited to portions of the production.

Furthermore, these apparatuses and devices in addition to their drivability are constructed and arranged within the production line so that the surface processing can be carried out selectively over the entire width of the slab or can be limited in a targeted manner to local or isolated sections of the width of the slab or the length of the slab.

BRIEF DESCRIPTION OF THE DRAWING

Below, in connection with the schematic illustrations of embodiments, further features and benefits of the invention will be described in greater detail. They show.

DETAILED DESCRIPTION OF THE INVENTION

Figure 1:
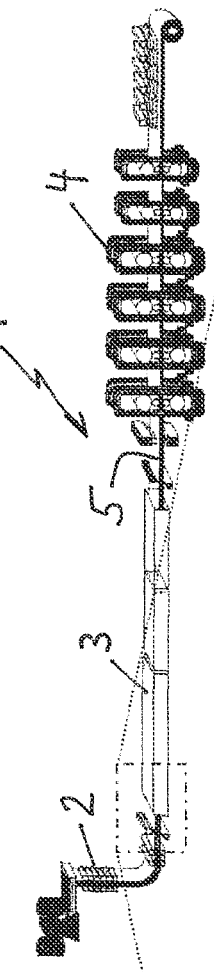
FIG. 1 a CSP-production line with a surface treatment arranged before the heating furnace, FIG. 2 a section of FIG. 1 with a surface treating device, FIG. 3 a section of FIG. 1 with an alternative arrangement of the surface treating device, FIG. 4 a CSP-production line with a surface treatment arranged behind the heating furnace, FIG. 5 a section of FIG. 4 with a surface treating device.

FIG. 1 shows a perspective view of a plant flow image of a CSP-production line 1 with its main components, a CSP-casting machine 2, a heating furnace 3 and a hot rolling train 4, in which in the production direction 11 (in the drawing from left to right) a slab 5 is cast, heated and then hot-rolled. In this plant flow image the region of the CSP-production line 1 between the casting machine 2 and the heating furnace 3, in which the inventive surface treatment is carried out, is indicated in dashed lines.

Figure 2:
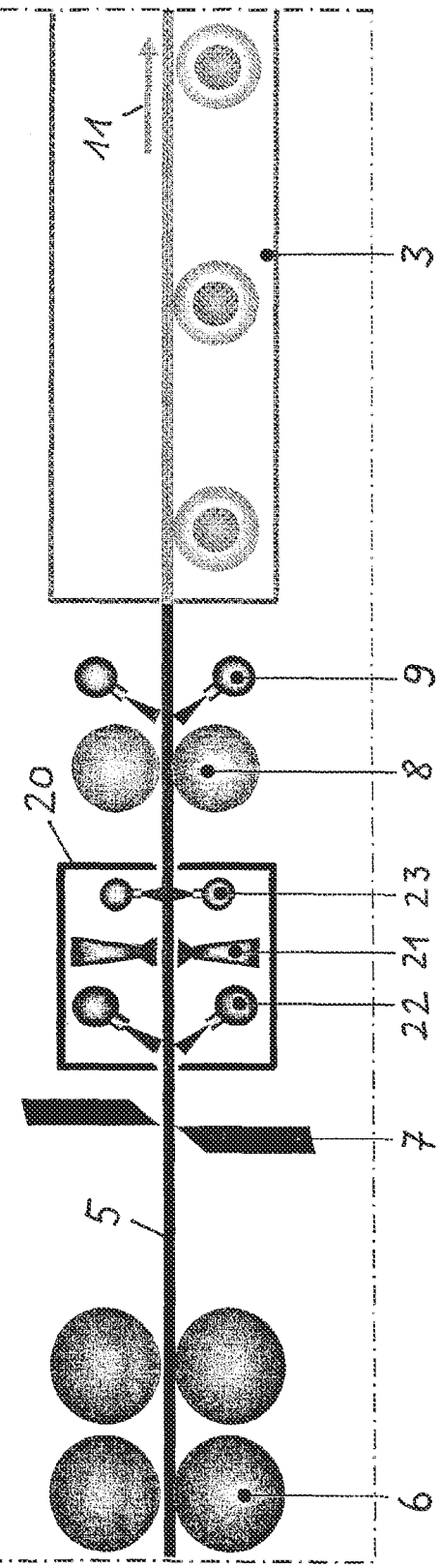

FIG. 2 shows a corresponding enlargement of the dashed region of FIG. 1 in a side view, beginning with the exit direction drivers 6 of the CSP-casting machine 2 with a subsequently arranged shear 7 for producing individual slabs. In the production direction 11, behind the shears 7 is a surface treatment device 20 that includes a low pressure or high pressure scale washer 22 for removing the naturally occurring scale, an oxidizing device 21 with nozzles or nozzle-like devices, by which an oxidizing flame or an oxidizing gas mixture is directed on the outer surface of the slab 5 in a targeted manner, and wetting nozzles 23 for cooling, for example with water, and for embrittling the resulting oxide layers as well as the newly formed scale. In the production direction 11, a roll pair 8 is arranged behind the surface treatment device 20, the purpose of the roll pair is the mechanical breaking up of the embrittled oxidation product, which is subsequently removed from the slab surface in a following low pressure scale washer 9.

In FIG. 2, the surface treatment device 20 is shown with a black border as an enclosed unit to imply that the entire surface treatment device can be removed from the production line 1.

Figure 3:
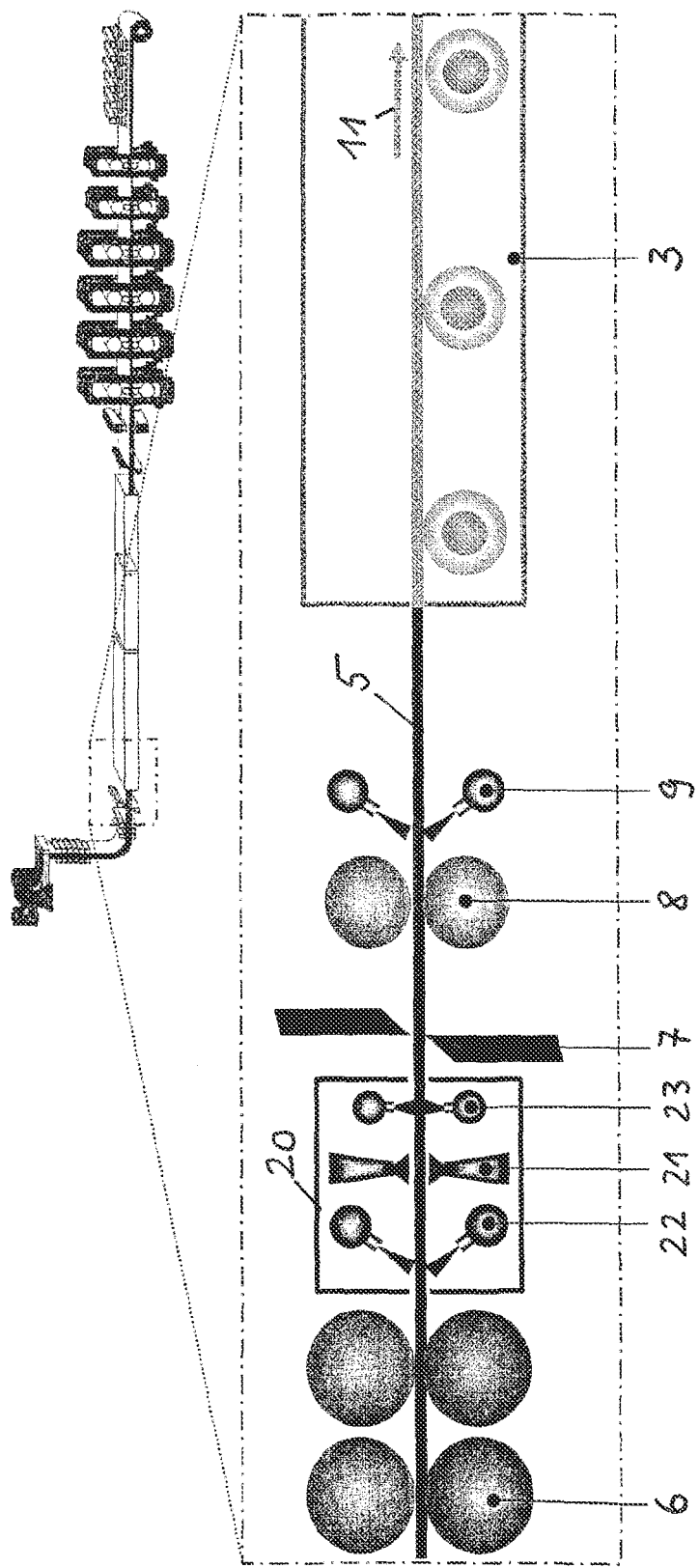

FIG. 3 shows an alternative surface treatment device 20 in the production direction 11 ahead of the shears 7. Compared to FIG. 2 there are no further changes so that the reference numerals utilized here and those used in describing the carrying out of the surface treatment in FIG. 2 are also applicable for FIG. 3.

A further alternative relocation of the surface treating device 20 is shown in FIGS. 4 and 5. In FIG. 4, which shows a CSP-production line 1' corresponding to FIG. 1, the region of the CSP-production line 1' between the heating furnace 3 and the hot rolling train 4, in which the inventive surface treatment is carried out, is also indicated with dashed lines.

In FIG. 5 the dashed region of FIG. 4 is shown in an enlarged side view. Beginning at the left in the figure at the outlet of the heating furnace 3, the surface treatment device 20 is arranged in the production direction 11 between the heating furnace 3 and the shears 7. In contrast to FIGS. 2 and 3, in this arrangement the conventional high pressure scale washer 10 that is present before the hot rolling train 4 (not shown in this figure) can be inserted so that the low pressure scale washer 9 used in FIGS. 2 and 3 can be saved. Furthermore, the roll pair 8 that is necessary for the mechanical breaking up of the formed outer surface layers, can beneficially be used as a drive roll pair for the conventional high pressure scale washer 10. Except for the depicted differences, the remaining components with the same reference numerals, as well as the carrying out of the outer surface treatment, corresponds to the description of FIG. 2.

REFERENCE NUMERAL LIST 1, 1' CSP-production line
2 CSP-casting machine
3 Heating furnace
4 Hot rolling train
5 Slab
6 Directional driver of the casting machine
7 Shears
8 Roll pair
9 Low pressure scale washer
10 High pressure scale washer
11 Production direction
20 Outer surface treatment device
21 Oxidation device with nozzles or nozzle-like device
22 Low pressure or high pressure scale washer
23 Wetting nozzles

The invention claimed is:

1. Method for improving the outer surface quality by an in-line outer surface treatment of slabs (5), which are produced in a continuous process from strand casting to hot rolling, with a heating furnace (3) arranged between a Compact Strip Production (CSP) casting machine (2) and a hot rolling train (4), wherein a defined surface of the slab (5) with a layer thickness per slab side of up to 4 mm is oxidized in a targeted manner by an oxidizing flame or an oxidizing gas mixture applied to the upper and lower sides of the slab (5) by an oxidation device (21) containing nozzles or nozzle devices; wherein an oxidation product on the slab surface can be solid or liquid, wherein an oxidation treatment of the slab surface with an oxidizing flame or with an oxidizing gas mixture is combined with the following processing in-line method steps:

prior to the oxidation treatment the outer surface of the slab is freed of naturally occurring scale by a low pressure or high pressure scale washer (22), after the oxidation treatment a created oxidation layer as well as the newly formed scale is cooled by water cooling nozzles (23) or other appropriate media or tasks, then mechanically broken up in a roll pair (8) and removed from the surface of the slab by a low pressure scale washer (9) or a conventional high pressure scale washer (10).

2. Method according to claim 1, wherein for a targeted creation of oxidized layer thicknesses the following settings of the oxidation device (21) are carried out, either alone or in combination:

variation of the oxidation potential of the flame or the gas mixture applied to the slab outer surface for oxidation, variation of the volume stream of the gas used for oxidation, variation of the oxidation potential and/or the volume stream of the gas used for oxidation in dependence on a process parameter, variation of the spacing and the angle of the nozzles or the nozzle devices of the oxidation device (21) to the slab surface, construction and number of the nozzles or the nozzle devices (21).

3. Method according to claim 2, wherein the process parameter is slab transport speed or steel quality.

4. Method according to claim 1, wherein the outer surface treatment is carried out over the entire slab width.

5. Method according to claim 4, wherein in dependence on the prevailing location conditions of the slab, outer surface treatment of the slab (5) is carried out in-line after exit from the casting machine (2) and before entry in the heating furnace (3) or alternatively after exit from the heating furnace (3) and before entry into the hot rolling train (4).

6. Method according to claim 1, wherein the outer surface treatment is carried out variably by being targeted to local or isolated sections of the slab width or length.

7. Apparatus for improving the outer surface quality by an in-line outer surface treatment of slabs which are produced in a continuous process from strand casting to hot rolling, with a heating furnace (3) arranged between a Compact Strip Production (CSP) casting machine (2) and a hot rolling train (4), comprising an outer surface treating device (20), including:

a scale washer (22) operated in low or high pressure ranges, an oxidation device (21) containing a nozzle or nozzle device for applying an oxidizing flame or an oxidizing gas mixture on the slab surface, wetting nozzles (23) for cooling and for embrittling the layers produced by the nozzles or nozzle devices of the oxidation device (21) on the outer surface of the slab by oxidation, and a roll pair (8) following the outer surface treatment device (20) for mechanically breaking up the embrittled layers as well as a scale washer (9, 10) that operates in low or high pressure range for removing the embrittled layers from the slab surface.

8. Apparatus according to claim 7, wherein the oxidation device (21), scale washer (22), and wetting nozzles (23) of the outer surface treatment device (20) as well as the roll pair (8) and scale washer (9) are constructed so as to be drivable individually or in combination into and out of the production line.

9. Apparatus according to claim 7, wherein the oxidation device (21), scale washer (22), wetting nozzles (23), roll pair (8), and scale washer (9) required for outer surface treatments, in addition to their drivability, are constructed and arranged in the production line so that the outer surface treatments can be carried out over the entire slab width or selectively targeted to local or isolated sections of the slab width or length.

* * * * *